United States Patent
Vejlgaard et al.

(10) Patent No.: US 11,664,959 B2
(45) Date of Patent: May 30, 2023

(54) DYNAMIC CONFIGURATION OF USER EQUIPMENT DUPLEXING MODE

(71) Applicant: Nokia Technologies Oy, Espoo (FI)

(72) Inventors: Benny Vejlgaard, Gistrup (DK); Johannes Harrebek, Aalborg (DK); Oana-Elena Barbu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/818,670

(22) Filed: Mar. 13, 2020

(65) Prior Publication Data
US 2020/0313837 A1    Oct. 1, 2020

Related U.S. Application Data

(60) Provisional application No. 62/825,985, filed on Mar. 29, 2019.

(51) Int. Cl.
| | |
|---|---|
| *H04L 5/14* | (2006.01) |
| *H04W 76/27* | (2018.01) |
| *H04W 72/0446* | (2023.01) |
| *H04W 72/08* | (2009.01) |

(52) U.S. Cl.
CPC ........... *H04L 5/14* (2013.01); *H04W 72/0446* (2013.01); *H04W 72/082* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2010/0120446 A1* | 5/2010 | Gaal ................. | H04W 72/1231 455/452.2 |
| 2017/0163404 A1* | 6/2017 | Liu ..................... | H04W 72/042 |

FOREIGN PATENT DOCUMENTS

| | | | | |
|---|---|---|---|---|
| WO | 2017/111821 A1 | 6/2017 | | |
| WO | WO-2017111821 A1 * | 6/2017 | ........... | H04L 5/1423 |

OTHER PUBLICATIONS

"New WID on NR Uu Interface Enhancement", 3GPP TSG RAN Meeting #78, RP-172483, Agenda : 9.1.1, Huawei, Dec. 18-21, 2017, 5 pages.

(Continued)

*Primary Examiner* — Chi H Pham
*Assistant Examiner* — Raul Rivas
(74) *Attorney, Agent, or Firm* — Harrington & Smith

(57) ABSTRACT

A method for a user equipment includes determining full duplex capability and metric thresholds during cell search or attachment to a base station and reporting these to the base station; when in an RRC-connected state, dynamically sending reports of the metric conditions to the base station; and receiving instructions, based on the reports of the metric conditions, to communicate with the base station in one of a full duplex mode and a time division duplex mode. A method for a base station includes receiving a full duplex capability and metric thresholds from a user equipment; when in an RRC-connected state, initially scheduling the user equipment for communications in a time division duplex mode; receiving reports of metric conditions dynamically from the user equipment; and sending instructions, based on the reports, to the user equipment to communicate in one of a full duplex mode and a time division duplex mode.

20 Claims, 11 Drawing Sheets

(56) References Cited

OTHER PUBLICATIONS

"New SI proposal: Study on flexible and full duplex for NR", 3GPP TSG RAN Meeting #78, RP-172636, Agenda : 9.1.1, LG Electronics, Dec. 18-21, 2017, 5 pages.
Mahmood et al., "Physical-Layer Security With Full-Duplex Transceivers and Multiuser Receiver at Eve", Transactions on Communications, vol. 65, No. 10, Oct. 2017, pp. 4392-4405.
Sarret et al., "Analyzing the Potential of Full Duplex in 5G Ultra-Dense Small Cell Networks", EURASIP Journal on Wireless Communications and Networking, Issue No. 284, 2016, pp. 1-16.
Sarret et al., "Can Full Duplex reduce the discovery time in D2D Communication?", International Symposium on Wireless Communication Systems (ISWCS), Sep. 20-23, 2016, pp. 27-31.
Berardinelli et al., "Evaluating Full Duplex Potential in Dense Small Cells from Channel Measurements", IEEE 83rd Vehicular Technology Conference (VTC Spring), 2016, 5 pages.
Sarret et al., "Impact of Transport Control Protocol on Full Duplex Performance in 5G Networks", IEEE 83rd Vehicular Technology Conference (VTC Spring), 2016, 5 pages.
Sarret et al., "Providing Fast Discovery in D2D Communication with Full Duplex Technology", MACOM 2016, pp. 98-108.
Mahmood et al., "On the Potential of Full Duplex Communication in 5G Small Cell Networks", 13th International Wireless Communications and Mobile Computing Conference (IWCMC), 2017, pp. 1665-1670.
Mahmood et al., "Throughput Analysis of Full Duplex Communication with Asymmetric Traffic in Small Cell Systems", ICWMC, Oct. 2015, pp. 57-60.
Patent Cooperation Treaty Application No. PCT/EP2019/057862, "Guard Time Adaptation in Wireless Communication Networks", filed on Mar. 28, 2019, 25 pages.
U.S. Appl. No. 62/825,217, "Adapting Guard Band between Adjacent Channels", filed Mar. 28, 2019, 31 pages.
"3rd Generation Partnership Project; Technical Specification Group Radio Access Network; NR; Physical layer procedures for control (Release 15)", 3GPP TS 38.213, V15.4.0, Dec. 2018, pp. 1-104.
"3rd Generation Partnership Project; Technical Specification Group Radio Access Network; NR; Physical layer procedures for data (Release 15)", 3GPP TS 38.214, V15.4.0, Dec. 2018, pp. 1-102.
Extended European Search Report received for corresponding European Patent Application No. 20164089.3, dated Aug. 19, 2020, 10 pages.

\* cited by examiner

DYNAMIC CONFIGURATION OF USER EQUIPMENT DUPLEXING MODE

CROSS REFERENCE TO RELATED APPLICATION

This application claims the benefit of U.S. provisional application No. 62/825,985 entitled "DYNAMIC CONFIGURATION OF NR UE DUPLEXING MODE" filed on 29 Mar. 2019, which is incorporated herein by reference in its entirety.

TECHNICAL FIELD

This disclosure relates to a full duplexing mode for a user equipment (UE) in new radio (NR), more commonly known as 5G ($5^{th}$ Generation). More specifically, this disclosure relates to how an NR UE full duplex (FD) mode is dynamically configured based on a UE's self-interference cancellation (SIC) capability and conditions evaluation for entering an FD mode.

BACKGROUND

The current 3GPP NR Release 15 (Rel-15) specifications support frequency division duplex (FDD) and time division duplex (TDD) duplexing modes. For operation in unpaired bands, the TDD mode is defined. The TDD operation implies that a cell has either exclusive uplink, downlink, or no transmission for each instant of time. Hence, no option for simultaneous uplink and downlink transmission, as is the case for FDD operation, is supported by NR Rel-15 for TDD operation.

In the switching from downlink transmission to uplink transmission in a cell, guard time (GT) is typically inserted to avoid cross-link interference. The GT is implemented by muting one or multiple orthogonal frequency division multiplexing (OFDM) symbols.

The NR radio frame structure is rather flexible, allowing it to have a series of different slot formats. The NR specifications support fifty-six (56) slot formats, ranging from slots with only downlink transmission to slots with only uplink transmission over a large number of slot formats with a mixture of downlink, uplink, and flexible OFDM symbol configurations. In this context, a "flexible" OFDM symbol may be arbitrarily used for downlink or uplink, or may be muted.

One of the major challenges with TDD is a lack of support for simultaneous uplink and downlink transmissions in a cell. This is especially a challenge for ultra-reliable low-latency communication (URLLC) and time-sensitive network (TSN) use cases, where multiple, simultaneously active UEs must be served immediately, and, therefore, often require a cell to have simultaneous uplink and downlink transmission to accommodate strict latency/jitter and ultra-reliability requirements for all users.

Solutions for enhanced flexible duplexing for unpaired bands are therefore expected to be introduced in 3GPP NR Release 17 (Rel-17), such as by introducing the so-called flexible FDD mode for unpaired bands, where a single unpaired carrier can be more efficiently utilized by some physical resource blocks (PRBs) used for downlink transmission, while others are used for uplink. Such solutions will allow for simultaneous downlink/uplink operation, while still allowing dynamic adjustment of the resources for the two link directions in line with the offered traffic.

Allowing flexible duplexing in a cell offers quite some flexibility, but still does not fulfill the latency and jitter requirements for URLLC and TSN services as the number of users increases. Ultimately, some users will require FD operations; that is, they will need to use the same PRBs in uplink and downlink.

Using the same PRB for both transmission and reception will cause self-interference (SI); that is, the transmitted signal leaks energy onto the receive chain, contaminating the reception of the useful signal. To leverage the advantages of FD, SI needs to be properly managed, and, for this reason, self-interference cancellation (SIC) techniques are being studied widely.

On the gNB side, it is considered feasible that SIC can be adequately performed with a hybrid of analog filtering and digital cancellation techniques.

On the UE side, however, FD operation is challenged by the UE SIC capability, which is limited in a highly dynamic and power-constrained environment.

The main theme of the present disclosure is therefore dynamic in-cell configuration of the UE duplexing mode for optimized latency and jitter performance within capability bounds of the NR UE.

As depicted in FIG. 1, SIC can be introduced on the gNB side only, or on both the gNB and the UE sides dependent on the FD scheme. For gNB FD, the self-interference (SI) 102 is present only on the gNB side, whereas, for bi-directional FD, SI 104, 106 is also present on the UE side.

The present disclosure focuses on bi-directional FD, and proposes a method to overcome the associated SI problems at the UE side.

Obtaining and sustaining adequate SIC rejection performance relies on the stability of high rejection/isolation blocks being maintained over the operating conditions. In particular, the obtainable SIC performance is highly dependent on high uplink/downlink (UL/DL) antenna isolation, low phase noise, transmitter (aggressor) power level, scheduled bandwidth (BW), and cancellation processing power.

By "SIC rejection performance" is meant how well the UE's own transmitter (TX) signal is rejected at the UE receiver (RX) when in FD-SIC duplexing mode. The isolation between TX and RX must be adequate for the UE to maintain compliance to 3GPP receiver performance specifications at the given operating conditions. To be able to run FD at maximum TX power, the TX to RX isolation achieved by SIC must be >100 dB. This is a very challenging requirement and, thus, the idea to enable conditions dependent UE FD-SIC operation by capability evaluation and reporting is as described herein.

In comparison with the gNB, the SIC capability of the UE is limited by the physical size, power constraints, and strong time-varying antenna load mismatch—voltage standing wave ratio (VSWR). As such, the UE is considered to be the most sensitive application for SIC by far.

It is foreseen that UE SIC may be problematic to implement with adequate cancellation performance over all operating conditions, and, specifically, UE SIC may not provide adequate rejection performance at high UL power and/or at high communication bandwidth. The UL power limitation may arise from not fulfilling the challenging UL/DL antenna isolation requirement, and the band width (BW) limitation relates to the complexity required in the cancellation engine for coping with high in-band amplitude and group delay ripple.

Without gNB knowledge about UE SIC capability limitations, bi-directional FD cannot be scheduled under any conditions. UE SIC capability and conditions evaluation and reporting is the topic of the present disclosure.

It should be understood, both above and in the discussion to follow, that the term "gNB" should be understood to mean "network node". The term "gNB" is used to denote a network node in 5G. However, it should be understood that the present invention, as described below, is not limited to 5G, but may be applicable to other generations yet to be developed. As a consequence, "gNB" should be understood more broadly as a network node.

SUMMARY

In a first aspect of the present disclosure, a method for a user equipment comprises: determining full duplex capability and metric thresholds during cell search or attachment to a base station; reporting the full duplex capability and the metric thresholds to the base station; when in an RRC-connected state, dynamically sending reports of the metric conditions to the base station; and receiving instructions, based on the reports of the metric conditions, to communicate with the base station in one of a full duplex mode and a time division duplex mode.

In a second aspect of the present disclosure, an apparatus comprises: at least one processor; and at least one memory including computer program code, the at least one memory and the computer program code being configured, with the at least one processor, to cause the apparatus to perform the following: determine full duplex capability and metric thresholds during cell search or attachment to a base station; report the full duplex capability and the metric thresholds to the base station; when in an RRC-connected state, dynamically send reports of the metric conditions to the base station; and receive instructions, based on the reports of the metric conditions, to communicate with the base station in one of a full duplex mode and a time division duplex mode.

In a third aspect of the present disclosure, an apparatus comprises: means for determining full duplex capability and metric thresholds during cell search or attachment to a base station; means for reporting the full duplex capability and the metric thresholds to the base station; means for sending reports of the metric conditions to the base station dynamically when in an RRC-connected state; and means for receiving instructions, based on the reports of the metric conditions, to communicate with the base station in one of a full duplex mode and a time division duplex mode.

In a fourth aspect of the present disclosure, a computer program product comprises a non-transitory computer-readable storage medium bearing computer program code embodied therein for use with a computer, the computer program code comprising code for performing: determining full duplex capability and metric thresholds during cell search or attachment to a base station; reporting the full duplex capability and the metric thresholds to the base station; sending reports of the metric conditions to the base station dynamically when in an RRC-connected state; and receiving instructions, based on the reports of the metric conditions, to communicate with the base station in one of a full duplex mode and a time division duplex mode.

In a fifth aspect of the present disclosure, a method for a base station comprises: receiving a full duplex capability and metric thresholds from a user equipment; when in an RRC-connected state, initially scheduling the user equipment for communications in a time division duplex mode; receiving reports of metric conditions dynamically from the user equipment; and sending instructions, based on the reports of the metric conditions, to the user equipment to communicate in one of a full duplex mode and a time division duplex mode.

In a sixth aspect of the present disclosure, an apparatus comprises: at least one processor; and at least one memory including computer program code, the at least one memory and the computer program code being configured, with the at least one processor, to cause the apparatus to perform the following: receive a full duplex capability and metric thresholds from a user equipment; when in an RRC-connected state, initially schedule the user equipment for communications in a time division duplex mode; receive reports of metric conditions dynamically from the user equipment; and send instructions, based on the reports of the metric conditions, to the user equipment to communicate in one of a full duplex mode and a time division duplex mode.

In a seventh aspect of the present disclosure, an apparatus comprises: means for receiving a full duplex capability and metric thresholds from a user equipment; means for initially scheduling the user equipment for communications in a time division duplex mode when in an RRC-connected state; means for receiving reports of metric conditions dynamically from the user equipment; and means for sending instructions, based on the reports of the metric conditions, to the user equipment to communicate in one of a full duplex mode and a time division duplex mode.

In an eighth aspect of the present disclosure, a computer program product comprises a non-transitory computer-readable storage medium bearing computer program code embodied therein for use with a computer, the computer program code comprising code for performing: receiving a full duplex capability and metric thresholds from a user equipment; initially scheduling the user equipment for communications in a time division duplex mode when in an RRC-connected state; receiving reports of metric conditions dynamically from the user equipment; and sending instructions, based on the reports of the metric conditions, to the user equipment to communicate in one of a full duplex mode and a time division duplex mode.

BRIEF DESCRIPTION OF THE DRAWINGS

The foregoing and other aspects of these teachings are made more evident in the following detailed description, when read in conjunction with the attached drawing figures.

DETAILED DESCRIPTION

The present invention resolves the problem in a bi-directional FD scenario and provides solutions on how NR UE FD mode is dynamically configured based on UE SIC capability and conditions evaluation for entering FD mode.

The present invention proposes that a gNB can dynamically configure the FD scheduling based on the UE FD-SIC capability and limitations. It provides the signaling procedures between the gNB and FD-SIC capable UEs that enable dynamic configuration of the UE duplexing mode on a per user/per scenario basis.

In the present disclosure, methods and signaling procedures between a gNB and FD-SIC-capable UEs enabling dynamic configuration of the UE duplexing mode on a per user/per scenario basis are proposed. The methods are driven by the gNB and can be triggered only for specific conditions, such as dense network, tight latency requirements, etc. The methods rely on the idea that, when the gNB knows about the UE FD-SIC capability and limitations, it can dynamically configure for FD scheduling whenever the UE is within its capability bounds.

The methods may include any of the following:
UE FD capability and metric thresholds reporting to gNB during attach procedures may comprise any of:
FD capability (Capable, Not Capable)
UL power threshold (The UE supports FD operation only below this UL power threshold.)
BW threshold (The UE supports FD operation only below this scheduled BW threshold.)
Duplexing mode switching time (Guard time required by UE for switching to and from full duplex mode, or between different types of duplexing modes.)
Radio resource control (RRC) connected: Dynamic UE metric conditions reporting to gNB.
RRC connected: gNB processing for optimum scheduling based on the UE reporting.
RRC connected: Dynamic gNB to UE duplex mode configuration.

The thresholds listed above may be fixed threshold values for all UL/DL configurations or a list of UL/DL configuration specific values.

More specifically, the parameter threshold values can be UE-specific and set by the UE. How to set the values may depend on UE capability and can be UE implementation specific. Values may be fixed set by design or characterization, or by some local means to measure self-interference level. Either way, no information is required from the network side to set the values. In some embodiments, the UE may be required to report its threshold values to the gNB.

In other words, support for FD and associated parameter thresholds and duplexing mode switching time can be UE-specific, known by the UE by design/local measurement/characterization and may need to be reported to the gNB.

Figure 1:
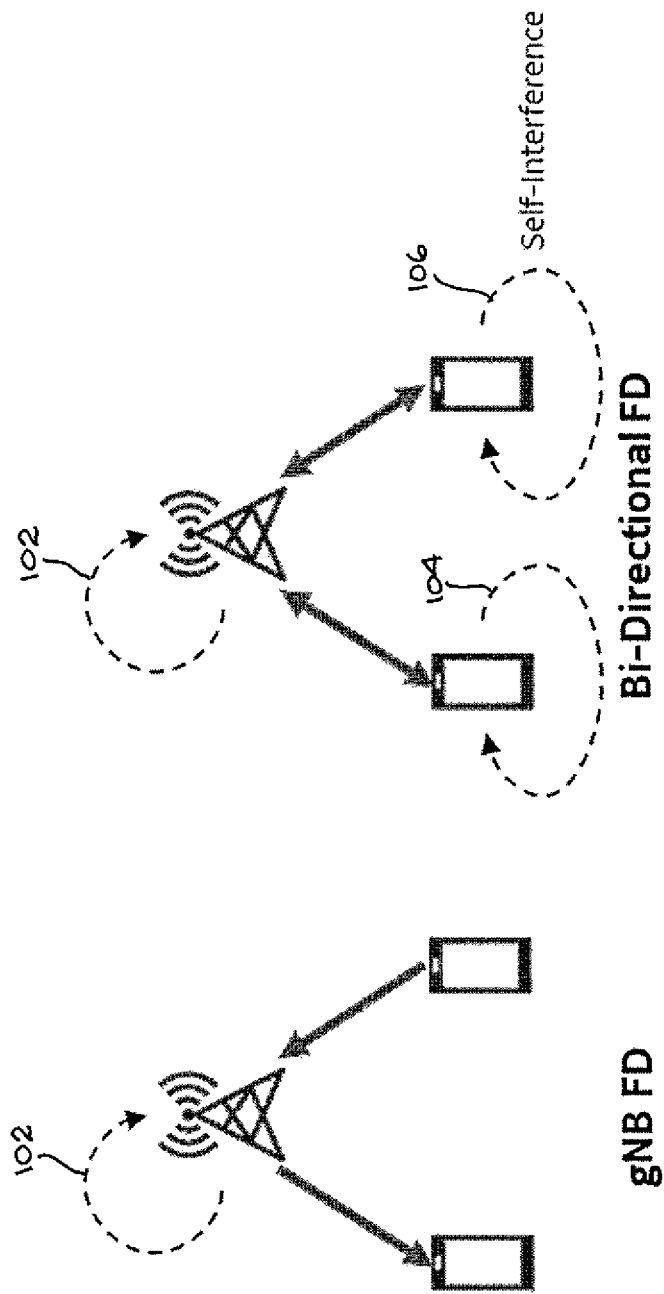
FIG. 1 illustrates full duplex schemes and their associated self-interference challenges.
Figure 2:
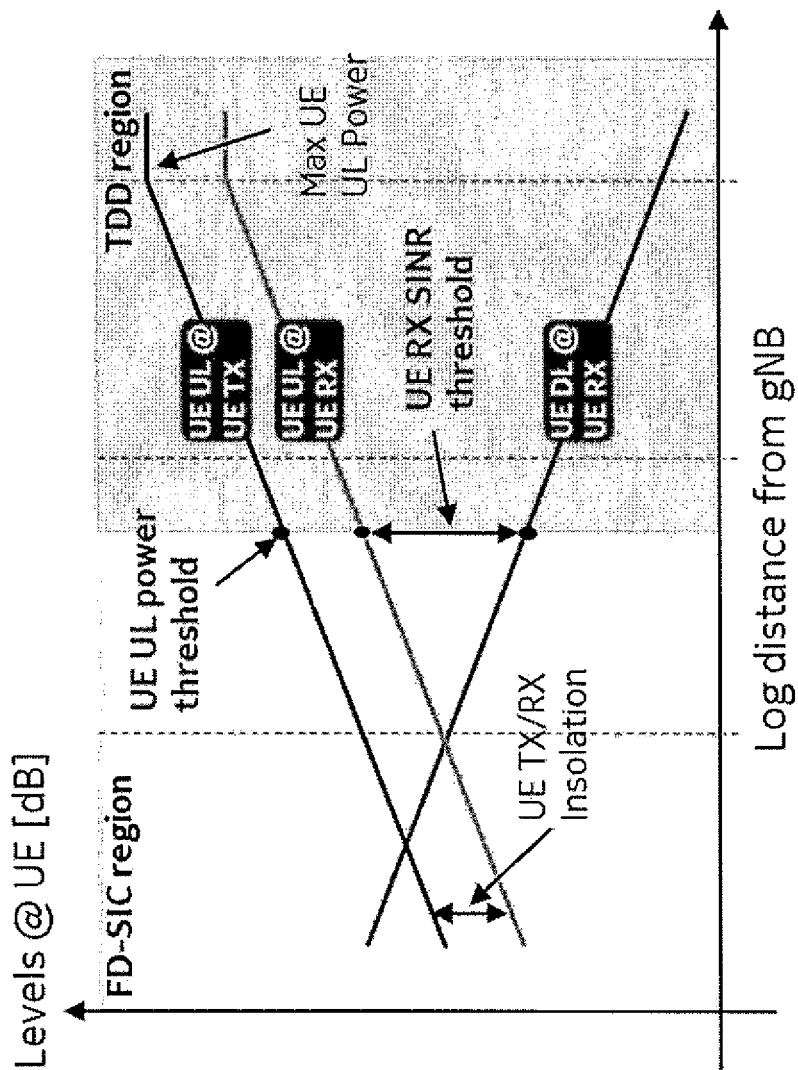
FIG. 2 is a simplified figure of the proposed dynamic UE duplexing scheduling method.

A simplified cell scenario is illustrated in FIG. 2. In this scenario, the UE, if it is FD-SIC capable, may be scheduled for FD-SIC operation whenever the distance to a gNB is low enough for the UE UL power and/or the UE RX signal to interference plus noise ratio (SINR) to be within threshold limits. Farther out toward a cell edge, the UE cannot guarantee adequate interference cancellation by SIC, and the gNB must resume legacy TDD UE scheduling.

Figure 3:
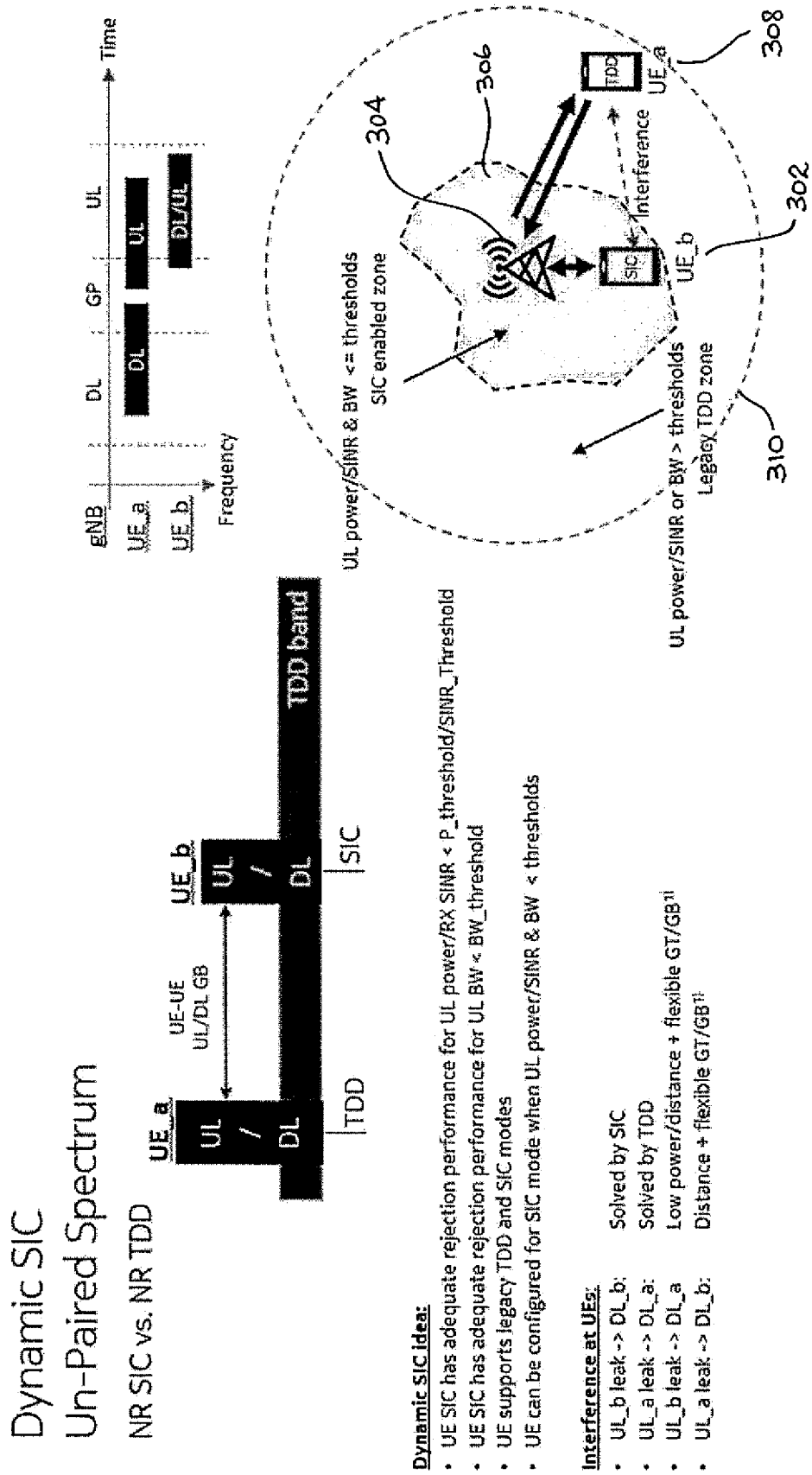
FIG. 3 illustrates the present dynamic UE duplexing scheduling method including UE interference identification.

A similar scenario is depicted in FIG. 3. UE_b 302 is close to the gNB 304, and, therefore, UL power is low and DL level is high, and, thus, FD SIC operation can be enabled (shaded SIC-enabled zone 306). UE_a 308, on the other hand, is at cell edge 310 experiencing high UL power and low DL power, so SIC cannot be performed adequately for FD operation and UE must be scheduled in legacy TDD mode.

UE_b self-interference is solved by SIC, and UE_a self-interference is avoided by TDD. UE_b UL may cause interference onto overlapping UE_a DL and vice versa. This interference is mitigated primarily by careful gNB scheduling applying flexible guard time and guard bands (GB).

In the following, the signaling flow for four different implementation examples having slightly different assessment and reporting schemes is shown.

| Implementation | Metric | UE reporting |
| --- | --- | --- |
| A | UE UL Power & SINR | FD-SIC Status Report (Boolean FD-flag, UE eval based) |
| B | UE UL Power & SINR | Reference signal received power (RSRP) report (gNB estimation based) |
| C | UE UL Power | FD-SIC Status Report (Boolean FD-flag, UE eval based) |
| D | UE UL Power | Periodic UE UL Headroom Report |

For all implementation examples, it is assumed that UE FD-SIC is not enabled during cell search and attach, but only in an RRC-connected state under closed loop power control whenever the UE specific FD-SIC conditions are fulfilled.

Implementation Example A

Figure 4:
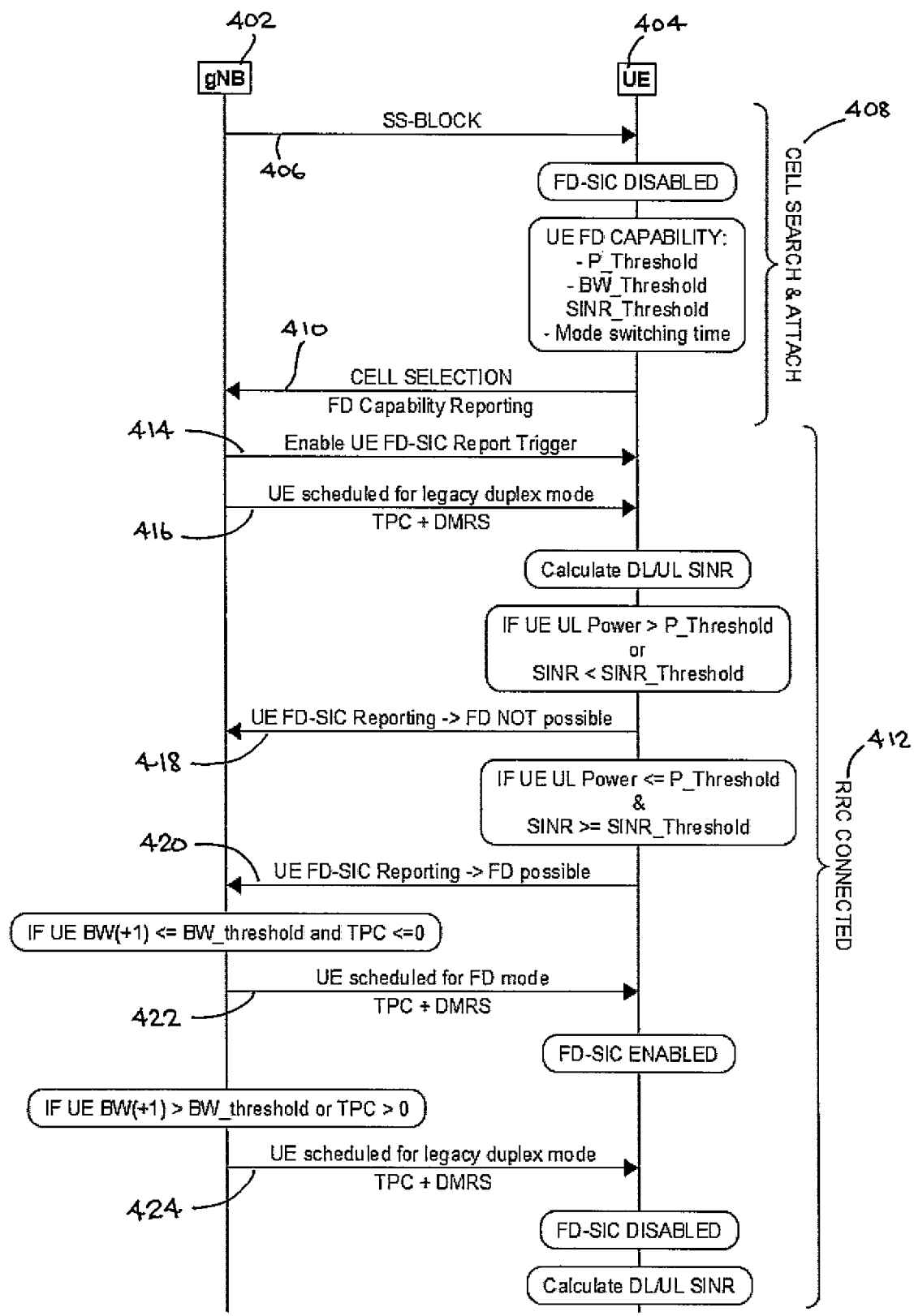
FIG. 4 is a flow diagram for implementation example A.

Referring to the flow diagram of FIG. 4, in an RRC-connected state, the gNB configures UE duplexing mode based on scheduled BW and UE FD-SIC reporting triggered by UE evaluation of UL Power vs P_Threshold and UE DL/UL SINR vs SINR_Threshold. The UE local DL/UL SINR calculation takes as input prior-art gNB signaled TPC and DMRS for calculation of UE UL transmit power and UE DL received power.

UE duplexing mode is configured by gNB based on:
UE own evaluation report based on:
UE UL Power Level (to avoid saturation of high-gain receiver)
UE DL/UL SINR
UE BW
Standards Novelties:
UE→gNB FD capability reporting to gNB
RRC connected: UE→gNB FD-SIC feasibility reporting
RRC connected: gNB→UE duplex mode signaling Referring more particularly to FIG. 4, during a cell search and attachment period 408, UE 404 receives a synchronization signal (SS) block from gNB 402 in a signal 406. During period 408, the UE's FD-SIC is disabled, and the UE 404 determines its FD capability in terms of P_threshold, BW_threshold, SINR_threshold, and mode switching time. UE 404 then makes a cell selection and sends its FD capability to the gNB 402 in signal 410.

During the ensuing RRC-connected period 412, gNB 402 sends a trigger to UE 404 to enable FD-SIC reporting in signal 414, and schedules UE 404 for legacy (TDD) duplex mode in signal 416. The UE 404 then calculates DL/UL SINR, and, when UE UL power is greater than P_threshold or SINR is less than SINR_threshold, sends signal 418 to gNB 402 indicating that FD is not possible. On the other hand, when UE UL power is less than or equal to P_threshold and SINR is greater than or equal to SINR_threshold, UE 404 sends signal 420 indicating that FD is possible.

Subsequently, when gNB 402 determines that UE BW(+1) is less than or equal to BW_threshold and TPC is less than or equal to 0, gNB 402 sends signal 422 to UE 404 indicating that UE 404 is scheduled for FD mode. At that point, UE 404 is FD-SIC enabled. On the other hand, when gNB 402 determines that UE BW(+1) is greater than BW_threshold or TPC is greater than 0, gNB 402 sends signal 424 to UE 404 indicating that UE 404 is scheduled for legacy (TDD) mode. At that point, UE 404 is FD-SIC disabled.

This dynamic process is then repeated, beginning with the UE 404 calculating DL/UL SINR.

Implementation Example B

Figure 5:
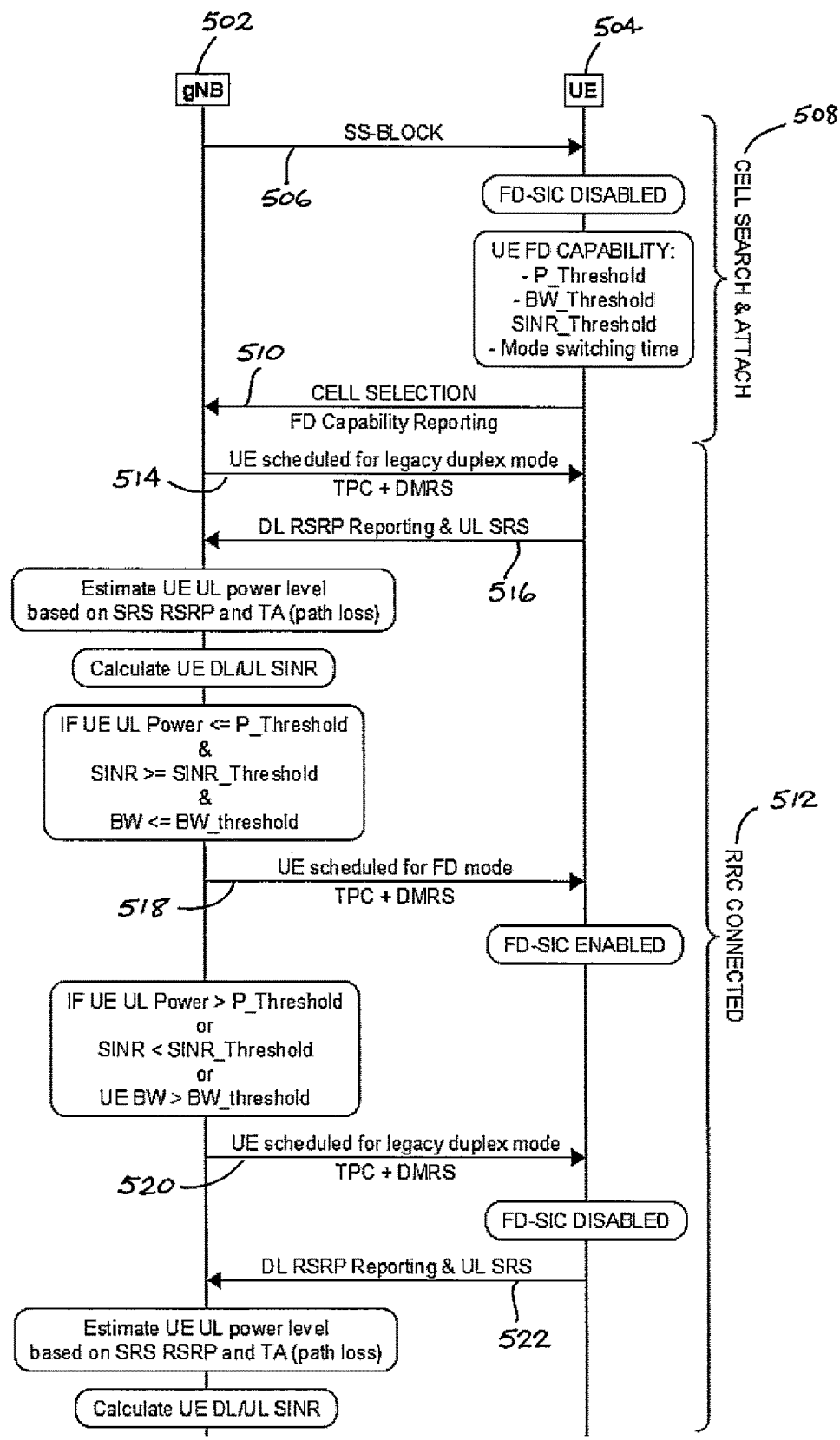
FIG. 5 is a flow diagram for implementation example B.

Referring to the flow diagram of FIG. 5, in an RRC-connected state, the gNB configures UE duplexing mode based on scheduled BW and an estimation of the UE UL Power and UE DL/UL SINR. The gNB receives information about the UE DL power level via the prior-art UE DL RSRP reporting, and gNB estimates the UE UL power based on monitored UE UL SRS RSRP and timing advance (TA) information (path loss).

UE duplexing mode is configured by gNB based on:
Estimated UE UL Power Level (to avoid saturation of high-gain receiver)
UE DL/UL SINR
UE BW
Standards Novelties:
UE→gNB FD capability reporting to gNB
RRC connected: gNB→UE duplex mode signaling Referring more particularly to FIG. 5, during a cell search and attachment period 508, UE 504 receives a synchronization signal (SS) block from gNB 502 in a signal 506. During period 508, the UE's FD-SIC is disabled, and the UE 504 determines its FD capability in terms of P_threshold, BW_threshold, SINR_threshold, and mode switching time. UE 504 then makes a cell selection and sends its FD capability to the gNB 502 in signal 510.

During the ensuing RRC-connected period 512, gNB 502 schedules UE 504 for legacy (TDD) duplex mode in signal 514. In signal 516, UE 504 sends DL RSRP reporting and UL SRS to gNB 502, which then estimates UE UL power level based on SRS RSRP and TA (path loss), and calculates the UE DL/UL SINR.

When UE UL power is less than or equal to P_threshold and SINR is greater than or equal to SINR_threshold and BW is less than or equal to BW_threshold, gNB 502 sends signal 518 to UE 504 indicating that FD is possible. At that point, UE 504 is FD-SIC enabled. On the other hand, when UE UL power is greater than P_threshold or SINR is less than SINR_threshold or UE BW is greater than BW_threshold, gNB 502 sends signal 520 to UE 504 indicating that FD is not possible. At that point, UE 504 is FD-SIC disabled.

This dynamic process is then repeated, beginning with the UE 504 sending DL RSRP reporting and UL SRS to gNB 502 in signal 522. The gNB 502 then estimates UE UL power level based on SRS RSRP and TA (path loss), and calculates the UE DL/UL SINR.

Implementation Example C

Figure 6:
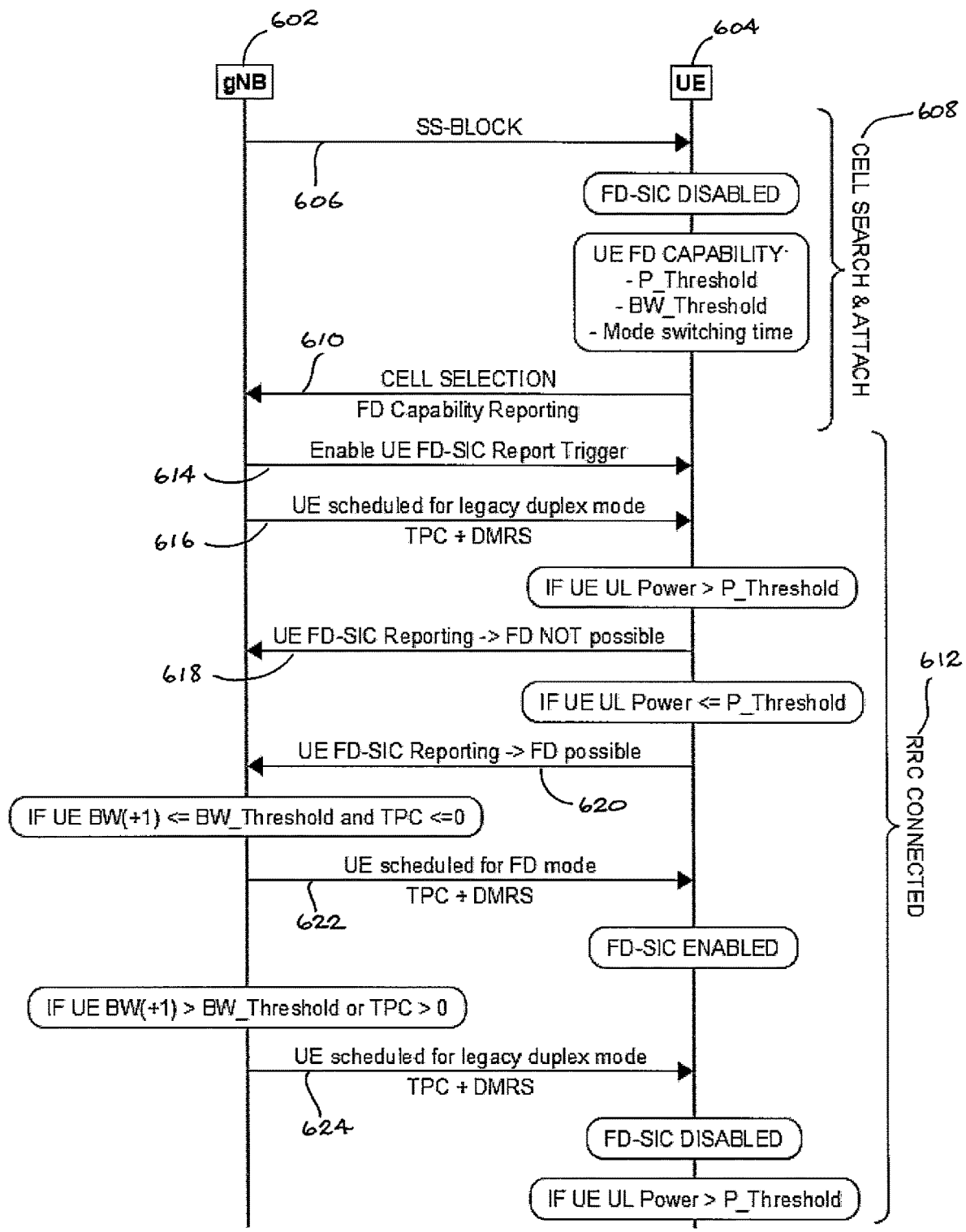
FIG. 6 is a flow diagram for implementation example C.

Referring to the flow diagram of FIG. 6, in an RRC-connected state, the gNB configures UE duplexing mode based on scheduled BW and UE FD-SIC reporting triggered by UE local evaluation of UL Power vs P_threshold. This implementation example assumes that correlation between UE UL power level and UE receiver SINR is adequate for assessment of expected UE FD-SIC performance.

UE duplexing mode configured by gNB based on:
UE own evaluation report based on:
UE UL Power Level (avoid saturation of high-gain receiver, correlation to RX SINR)
UE BW
Standards Novelties:
UE→gNB FD capability reporting to gNB
RRC connected: UE→gNB FD-SIC feasibility reporting
RRC connected: gNB→UE duplex mode signaling Referring more particularly to FIG. 6, during a cell search and attachment period 608, UE 604 receives a synchronization signal (SS) block from gNB 602 in a signal 606. During period 608, the UE's FD-SIC is disabled, and the UE 604 determines its FD capability in terms of P_threshold, BW_threshold, and mode switching time. UE 604 then makes a cell selection and sends its FD capability to the gNB 602 in signal 610.

During the ensuing RRC-connected period 612, gNB 602 sends a trigger to UE 604 to enable FD-SIC reporting in signal 614, and schedules UE 604 for legacy (TDD) duplex mode in signal 616. When UE UL power is greater than P_threshold, UE 604 sends signal 618 to gNB 602 indicating that FD is not possible. On the other hand, when UE UL power is less than or equal to P_threshold, UE 604 sends signal 620 indicating that FD is possible.

Subsequently, when gNB 602 determines that UE BW(+1) is less than or equal to BW_threshold and TPC is less than or equal to 0, gNB 602 sends signal 622 to UE 604 indicating that UE 604 is scheduled for FD mode. At that point, UE 604 is FD-SIC enabled. On the other hand, when gNB 602 determines that UE BW(+1) is greater than BW_threshold or TPC is greater than 0, gNB 602 sends signal 624 to UE 604 indicating that UE 604 is scheduled for legacy (TDD) mode. At that point, UE 604 is FD-SIC disabled.

This dynamic process is then repeated, beginning with the UE 604 determining if UE UL power is greater than P_threshold.

Implementation Example D

Figure 7:
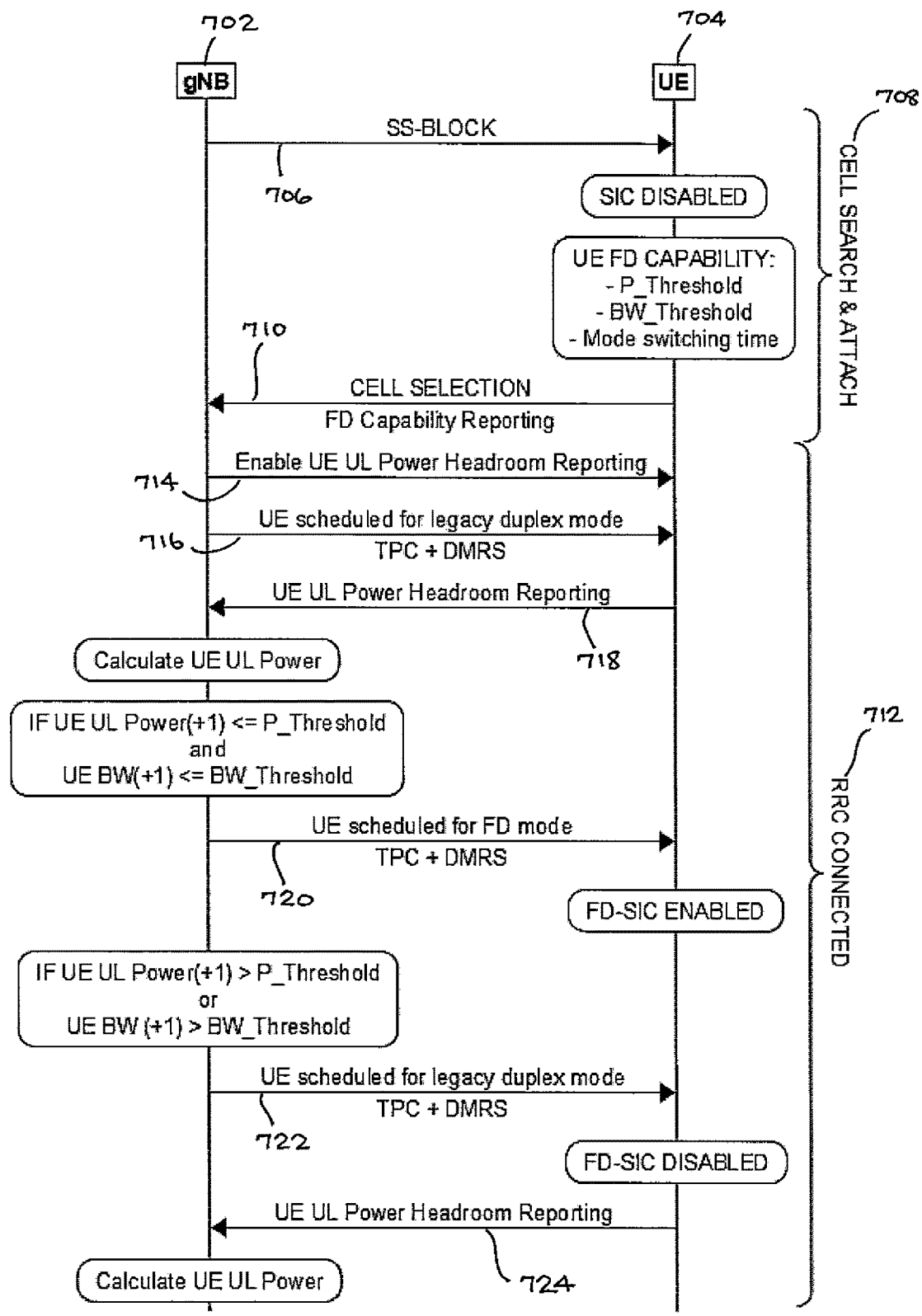
FIG. 7 is a flow diagram for implementation example D.

Referring to the flow diagram of FIG. 7, in an RRC-connected state, the gNB configures UE duplexing mode based on scheduled BW and absolute UE UL power obtained via periodic UE UL power headroom reporting. This implementation example assumes that correlation between UE UL power level and UE receiver SINR is adequate for the assessment of expected UE FD-SIC performance.

UE duplexing mode configured by gNB based on:
UE UL Power Level (avoid saturation of high-gain receiver, correlation to RX SINR)
UE BW
Standards Novelties:
UE→gNB FD capability reporting to gNB
RRC connected: gNB→UE duplex mode signaling Referring more particularly to FIG. 7, during a cell search and attachment period 708, UE 704 receives a synchronization signal (SS) block from gNB 702 in a signal 706. During period 708, the UE's FD-SIC is disabled, and the UE 704 determines its FD capability in terms of P_threshold, BW_threshold, and mode switching time. UE 704 then makes a cell selection and sends its FD capability to the gNB 702 in signal 710.

During the ensuing RRC-connected period 712, gNB 702 enables UE UL power headroom reporting in signal 714 to UE 704, and schedules UE 704 for legacy (TDD) duplex mode in signal 716. In signal 718, UE 704 sends UL power headroom reporting to gNB 702, which then calculates UE UL power level.

When UE UL power (+1) is less than or equal to P_threshold and BW(+1) is less than or equal to BW_threshold, gNB 702 sends signal 720 to UE 704 indicating that FD is possible. At that point, UE 704 is FD-SIC enabled. On the other hand, when UE UL power (+1) is greater than P_threshold or UE BW (+1) is greater than BW_threshold, gNB 702 sends signal 722 to UE 704 indicating that FD is not possible. At that point, UE 704 is FD-SIC disabled.

This dynamic process is then repeated, beginning with the UE 704 sending UE UL power headroom reporting in signal 724 to gNB 702, which then calculates UE UL power level.

The advantage of the above procedures is that the gNB can make use of UEs with conditions constraint FD capability thereby optimizing the PRB utilization to cope with network densification, or stringent latency requirements. Additionally, the method can be switched on/off according to the stringency of the scenario, and the gNB can fall back to traditional TDD duplexing approach.

The described dynamic duplexing method may introduce UE-UE UL/DL interference which can be mitigated by flexible guard time and guard banding.

The proposed methods can be used:

For URLLC and TSN services to meet the latency requirements.

In dense 5G networks to optimize the resource utilization.

In a further embodiment, the UE can report updated threshold values in an RRC-connected state. This can allow for further scheduling flexibility in case a UE has capability to measure and trim its SIC performance adaptively.

Figure 8:
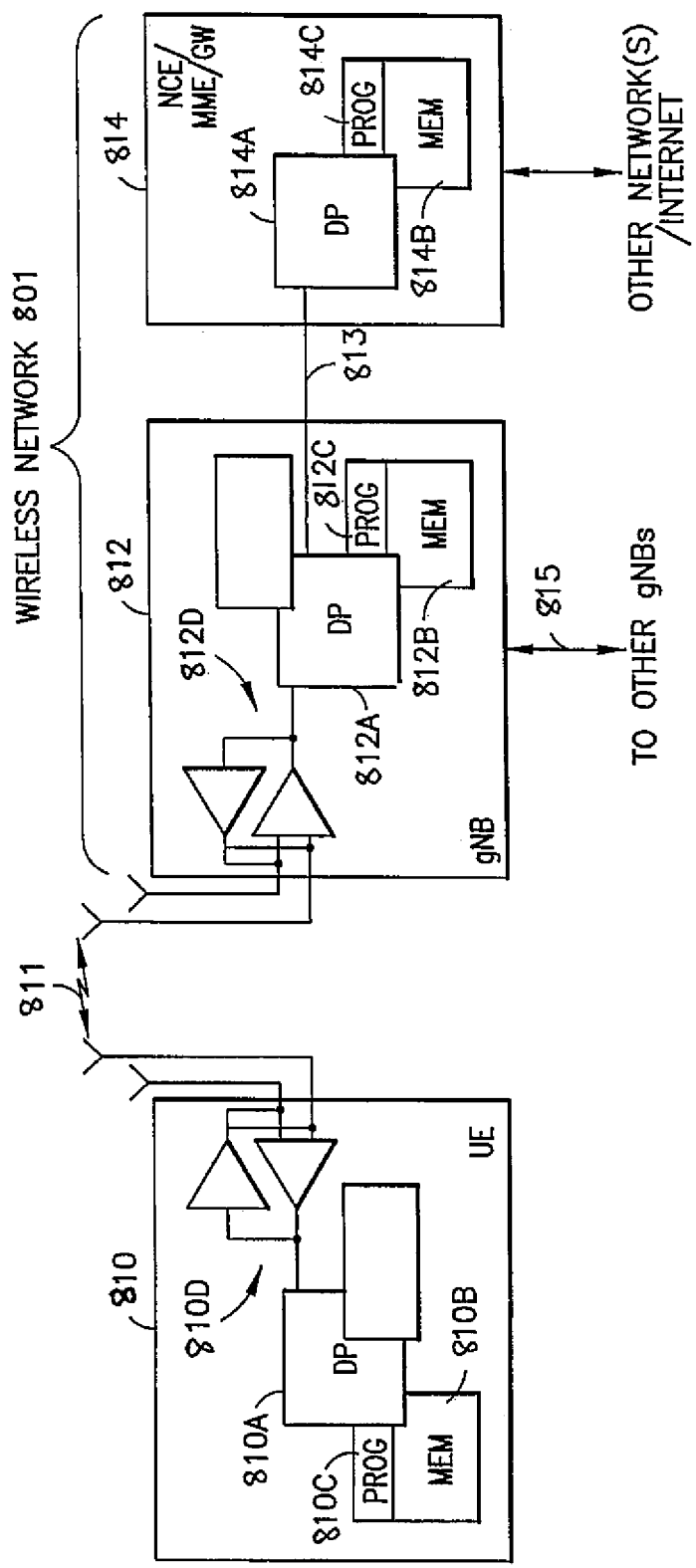
FIG. 8 shows a simplified block diagram of certain apparatus according to various exemplary embodiments of the present invention.

Reference is now made to FIG. 8 for illustrating a simplified block diagram of various electronic devices and apparatus that are suitable for use in practicing an exemplary embodiment of the present invention. In FIG. 8, a wireless network 801 is adapted for communication over a wireless link 811 with an apparatus, such as a mobile communication device, which is referred to as a UE 810, via a wireless network access node, such as a base station or relay station or remote radio head, and more specifically shown as a gNodeB (gNB) 812. The network 801 may include a network control element (NCE) 814, which serves as an access and mobility management function or entity (AMF or MME) and/or a serving gateway (S-GW) to a broader network, such as a public switched telephone/data network and/or the Internet.

The UE 810 includes a controller, such as a computer or a data processor (DP) 810A, a computer-readable memory medium embodied as a memory (MEM) 810B, which stores a program of computer instructions (PROG) 810C, and a suitable radio frequency (RF) transmitter and receiver 810D for bi-directional wireless communications with the gNodeB (gNB) 812 via one or more antennas. The gNodeB 812 also includes a controller, such as a computer or a data processor (DP) 812A, a computer-readable memory medium embodied as a memory (MEM) 812B that stores a program of computer instructions (PROG) 812C, and a suitable RF transmitter and receiver 812D for communication with the UE 810 via one or more antennas. The gNodeB 812 is coupled via a data/control path 813 to the NCE 814. The path 813 may be implemented as an S1 interface when the network 801 is an LTE network. The gNodeB 812 may also be coupled to another gNodeB via data/control path 815, which may be implemented as an X2 interface when the network 801 is an LTE network.

At least one of the PROGs 810C and 812C is assumed to include program instructions that, when executed by the associated DP, enable the device to operate in accordance with the exemplary embodiments of this invention as was detailed above with respect to FIGS. 4 to 7. That is, the exemplary embodiments of this invention may be implemented at least in part by computer software executable by the DP 810A of the UE 810 and/or by the DP 812A of the gNodeB 812, or by hardware, or by a combination of software and hardware (and firmware).

In general, the various embodiments of the UE 810 can include, but are not limited to, cellular telephones; personal digital assistants (PDAs) having wireless communication capabilities; portable computers having wireless communication capabilities; image capture devices, such as digital cameras, having wireless communication capabilities; gaming devices having wireless communication capabilities; music storage and playback appliances having wireless communication capabilities; and Internet appliances permitting wireless Internet access and browsing, as well as portable units or terminals that incorporate combinations of such functions.

The computer-readable MEMs 810B, 812B, 814B may be of any type suitable to the local technical environment and may be implemented using any suitable data storage technology, such as semiconductor-based memory devices, flash memory, magnetic-memory devices and systems, optical-memory devices and systems, fixed memory and removable memory. The DPs 810A, 812A, 814A may be of any type suitable to the local technical environment, and may include one or more of general purpose computers, special purpose computers, microprocessors, digital signal processors (DSPs) and processors based on a multicore processor architecture, as non-limiting examples.

It should be noted that the various DPs 810A, 812A, 814A may be implemented as one or more processors/chips, either or both of the UE 810 and the gNodeB 812 may include more than one transmitter and/or receiver 810D, 812D, and particularly the gNodeB 812 may have its antennas mounted remotely from the other components of the gNodeB 812, such as for example tower-mounted antennas.

Figure 9:
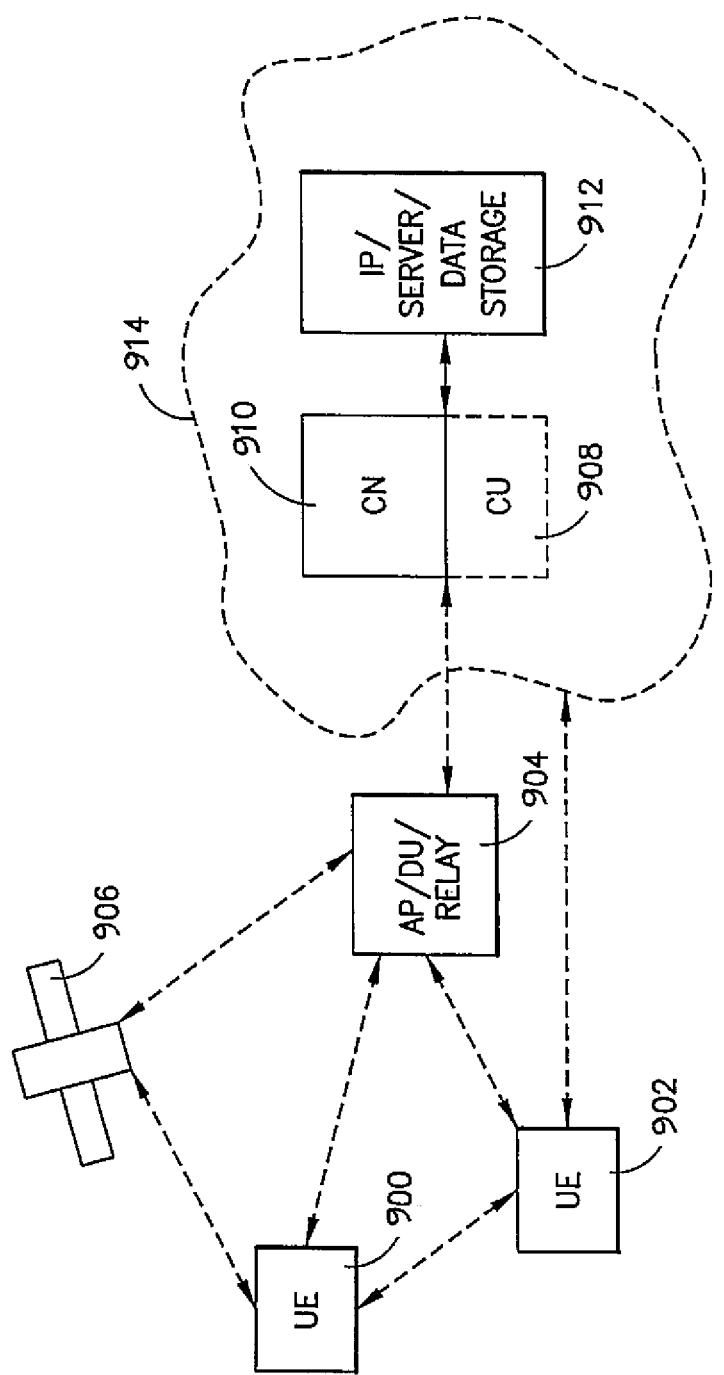
FIG. 9 shows part of another exemplary radio network.

Reference is now made to FIG. 9 for illustrating a simplified block diagram of various electronic devices and apparatus that are suitable for use in practicing another exemplary embodiment of the present invention. In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), and Internet Protocol multimedia subsystems (IMS) or any combination thereof.

FIG. 9 depicts examples of simplified system architectures only showing some elements and functional entities, all being logical units, whose implementation may differ from what is shown. The connections shown in FIG. 9 are logical connections; the actual physical connections may be different. It is apparent to a person skilled in the art that the system typically comprises also other functions and structures than those shown in FIG. 9.

The embodiments are not, however, restricted to the system given as an example, but a person skilled in the art may apply the solution to other communication systems provided with necessary properties.

The example of FIG. 9 shows a part of an exemplifying radio access network.

FIG. 9 shows user devices 900 and 902 configured to be in a wireless connection on one or more communication channels in a cell with an access node (such as (e/g)NodeB) 904 providing the cell. The physical link from a user device to a/an (e/g) NodeB is called uplink or reverse link and the physical link from the (e/g) NodeB to the user device is called downlink or forward link. It should be appreciated that (e/g) NodeBs or their functionalities may be implemented by using any node, host, server, or access point, etc., entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system to which it is coupled. The NodeB may also be referred to as a base station, an access point, or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 910 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in an Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 9, user devices may include two antennas. The number of reception and/or transmission antennas may naturally vary according to a current implementation.

Additionally, although the apparatuses have been depicted as single entities, different units, processors and/or memory units (not all shown in FIG. 9) may be implemented.

5G enables the use of multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC)), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 912, or utilize services provided by them. The communication network may also be able to support the usage of cloud services, for example, at least part of core network operations may be carried out as a cloud service (this is depicted in FIG. 9 by "cloud" 914). The communication system may also comprise a central control entity, or the like, providing facilities for networks of different operators to cooperate, for example, in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 904) and non-real time functions being carried out in a centralized manner (in a centralized unit, CU 908).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example, by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano-)satellites are deployed). Each satellite 906 in the mega-constellation may cover several satellite-enabled network entities that create on-ground cells. The on-ground cells may be created through an on-ground relay node 904 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g) NodeBs or may be a Home (e/g) nodeB. Additionally, in a geographical area of a radio communication system, a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 8 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H(e/g)nodeBs), a home node B gateway, or HNB-GW (not shown in FIG. 9). An HNB Gateway (HNB-GW), which is typically installed within an operator's network may aggregate traffic from a large number of HNBs back to a core network.

Figure 10:
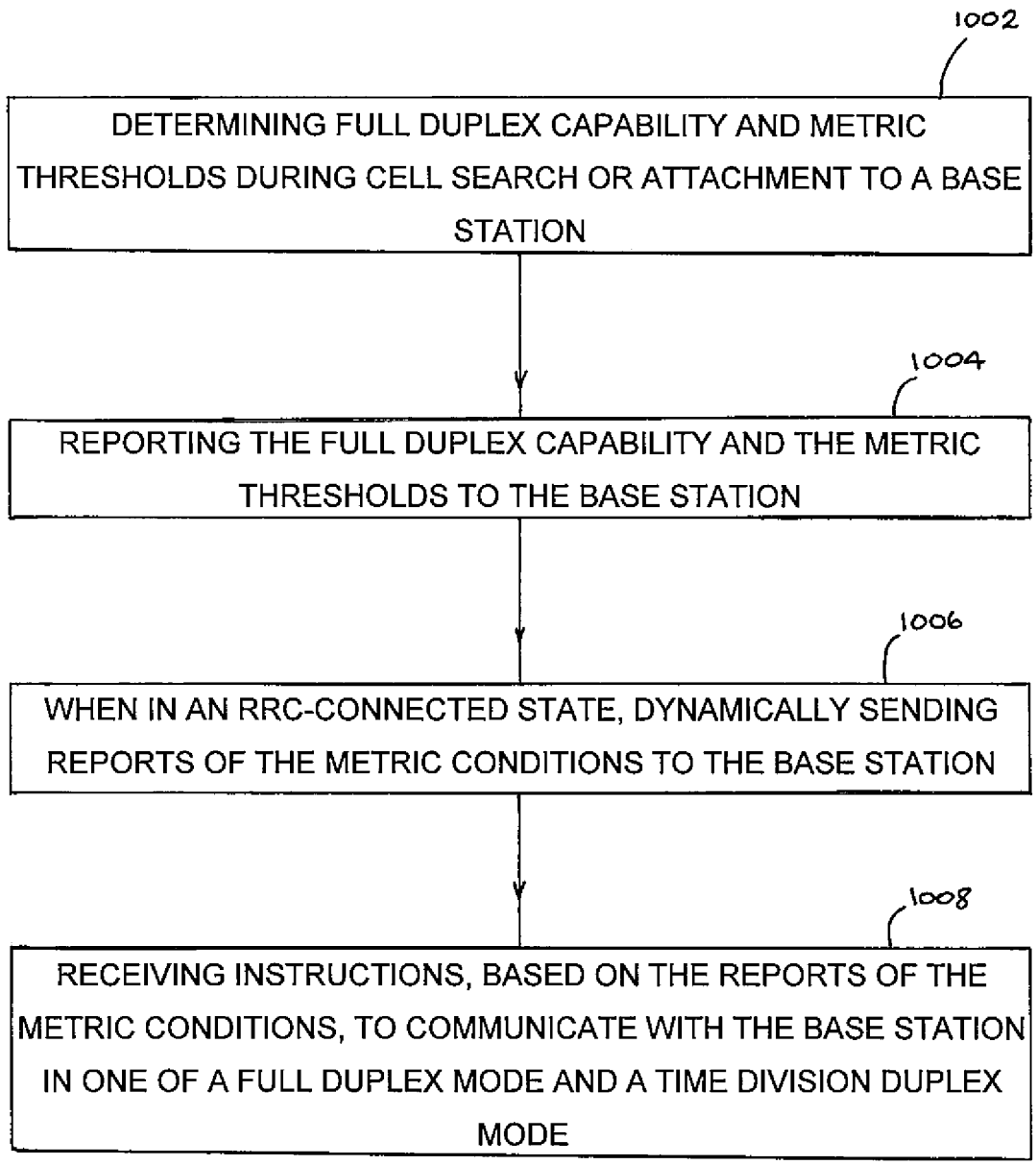
FIG. 10 is a flow chart illustrating a method performed by a user equipment in accordance with the present disclosure.

FIG. 10 is a flow chart illustrating a method performed by a user equipment in accordance with the present disclosure. In block 1002, the user equipment determines full duplex capability and metric thresholds during cell search or attachment to a base station. In block 1004, the user equipment reports the full duplex capability and the metric thresholds to the base station. In block 1006, the user equipment, when in an RRC-connected state, dynamically sends reports of the metric conditions to the base station. And, in block 1008, the user equipment receives instructions, based on the reports of the metric conditions, to communicate with the base station in one of a full duplex mode and a time division duplex mode.

Figure 11:
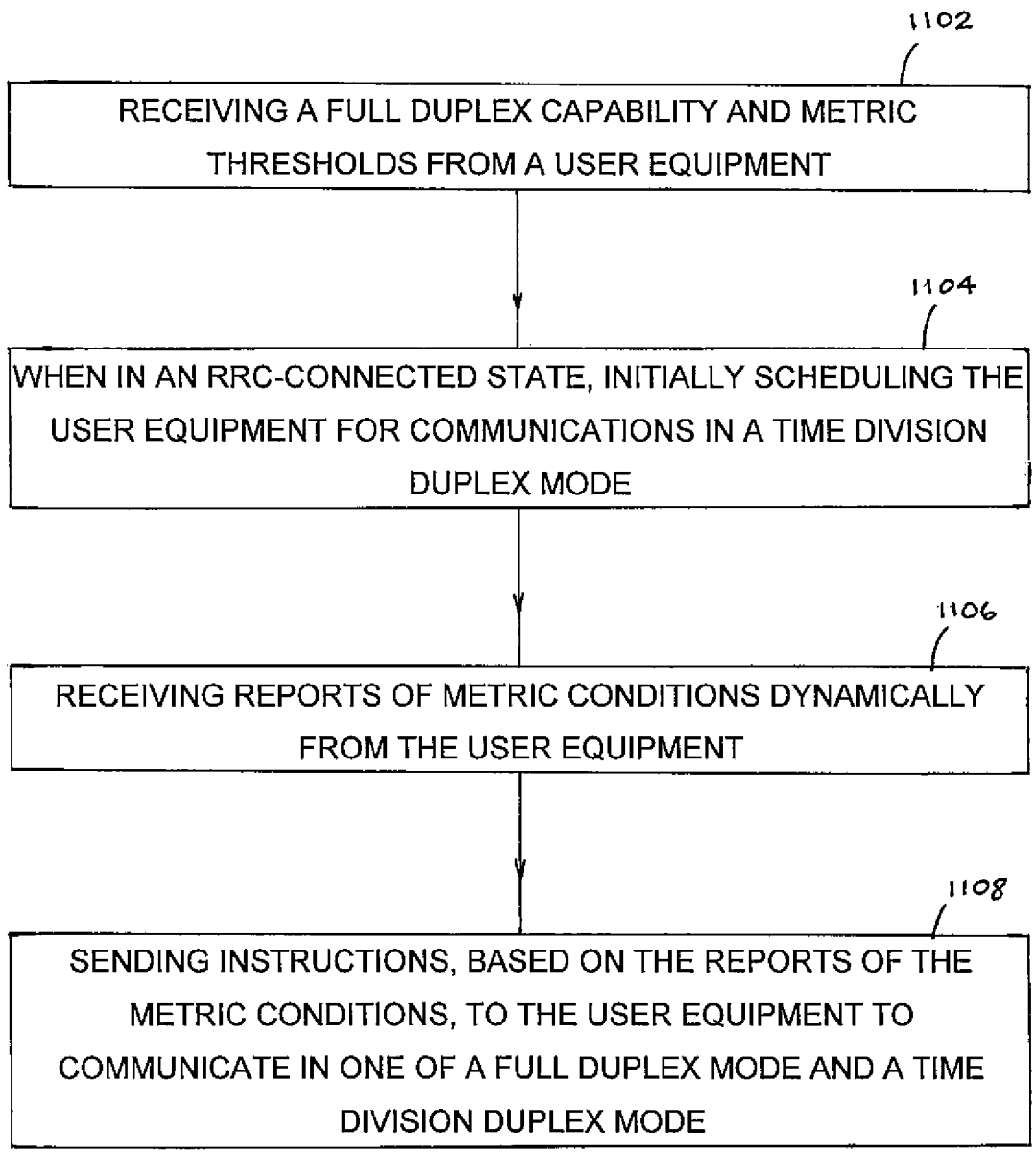
FIG. 11 is a flow chart illustrating a method performed by a base station in accordance with the present disclosure.

FIG. 11 is a flow chart illustrating a method performed by a base station in accordance with the present disclosure. In block 1102, the base station receives a full duplex capability and metric thresholds from a user equipment. In block 1104, the base station, when in an RRC-connected state, initially schedules the user equipment for communications in a time division duplex mode. In block 1106, the base station receives reports of metric conditions dynamically from the user equipment. And, in block 1108, the base station sends instructions, based on the reports of the metric conditions, to the user equipment to communicate in one of a full duplex mode and a time division duplex mode.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the invention is not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components, such as integrated circuit chips and modules, and that the exemplary embodiments of this invention may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this invention are not limited for use with only this one particular type of wireless communication system. The exemplary embodiments of the invention presented herein are explanatory and not exhaustive or otherwise limiting of the scope of the invention.

The following abbreviations have been used in the preceding discussion:
ACLR Adjacent Channel Leakage Ratio
BW Band Width
C/I Carrier to Interference Ratio
CLI Cross Link Interference
C-RNTI Cell Radio Network Temporary Identifier
DL Downlink
DMRS DeModulation Reference Signal
FD Full Duplex
FDD Frequency Division Duplex
GB Guard Band
gNB gNodeB (5G Base Station)
GT Guard Time
NR New Radio (5G)
OFDM Orthogonal Frequency Division Multiplexing
PRB Physical Resource Block
RRC Radio Resource Control
RS Reference Signal
RSRP Reference Signal Received Power (reported in dBm)
RX Receiver
SI Self-Interference
SIC Self-Interference Cancellation
SIB System Information Block
SINR Signal to Interference plus Noise Ratio
SRS Sounding Reference Signal
SS Synchronization Signal
TA Timing Advance
TDD Time Division Duplex
TPC Transmitter Power Control
TSN Time Sensitive Networks
TX Transmitter
UE User Equipment
UL Uplink
URLLC Ultra-Reliable Low-Latency Communication
VSWR Voltage Standing Wave Ratio
3GPP 3$^{rd}$ Generation Partnership Project
5G 5$^{th}$ Generation The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. A method comprising:
    determining, by a user equipment, full duplex capability and metric thresholds, for a cell selected during a cell search or attachment period to a base station;
    reporting to the base station the full duplex capability for the selected cell based on evaluating using the metric thresholds to the base station, wherein the reporting is based on evaluation of metrics of at least one of an uplink signal or downlink signal against metric thresholds comprising a signal to interference plus noise ratio threshold for the user equipment,
    wherein evaluating using the metric thresholds is based at least on values associated with at least uplink power of the user equipment compared to an uplink power threshold, and values associated with at least one of an uplink signal or downlink signal of the user equipment compared to the signal to interference plus noise ratio threshold for the user equipment;
    when in a radio resource control connected state, dynamically sending reports of metric conditions to the base station; and
    receiving instructions, based on the reports of the metric conditions, to communicate with the base station in one of a full duplex mode and a time division duplex mode.

2. The method as claimed in claim 1, wherein the metric conditions include one of:
    an uplink power threshold, said uplink power threshold being such that the user equipment supports full duplex operation only below the uplink power threshold;
    a bandwidth threshold, said bandwidth threshold being such that the user equipment supports full duplex operation only below the bandwidth threshold; and
    a duplexing mode switching time, said duplexing mode switching time being a guard time required by the user equipment for switching duplex mode between full duplex and time division duplex.

3. An apparatus comprising:
    at least one processor; and
    at least one memory including computer program code, the at least one memory storing instructions, that when executed by the at least one processor, cause the apparatus to:

determine full duplex capability and metric thresholds, by a user equipment, for a cell selected during a cell search or attachment to a base station;

based at least on an evaluation using the metric thresholds, report the full duplex capability for the selected cell and the metric thresholds to the base station, wherein the reporting is to be based on evaluation of metrics of at least one of an uplink signal or downlink signal against metric thresholds comprising a signal to interference plus noise ratio threshold for the user equipment, wherein evaluating using the metric thresholds is based at least on values associated with at least uplink power of the user equipment compared to an uplink power threshold, and values associated with at least one of an uplink signal or downlink signal of the user equipment compared to the signal to interference plus noise ratio threshold for the user equipment;

when in a radio resource control connected state, dynamically send reports of the metric conditions of the metric thresholds to the base station; and receive instructions, based on the reports of the metric conditions, to communicate with the base station in one of a full duplex mode and a time division duplex mode.

4. The apparatus as claimed in claim 3, wherein the full duplex capability is one of "capable" and "not capable" to communicate with the base station in full duplex mode.

5. The apparatus as claimed in claim 3, wherein the metric conditions include one of:
an uplink power threshold, said uplink power threshold being such that the user equipment supports full duplex operation only below the uplink power threshold;
a bandwidth threshold, said bandwidth threshold being such that the user equipment supports full duplex operation only below the bandwidth threshold; and
a duplexing mode switching time, said duplexing mode switching time being a guard time required by the user equipment for switching duplex mode between full duplex and time division duplex.

6. The apparatus as claimed in claim 5, wherein the duplexing mode is based on a scheduled bandwidth and a full duplex self-interference cancellation reporting triggered by an evaluation by the user equipment of uplink power against uplink power threshold and is based on evaluation of the metrics of the at least one of an uplink signal or downlink signal against the metric thresholds comprising the interference plus noise ratio threshold for the user equipment.

7. The apparatus as claimed in claim 5, wherein the duplexing mode is based on a scheduled bandwidth and an estimation of uplink power and based on evaluation of the metrics of the at least one of an uplink signal or downlink signal against the metric thresholds comprising the interference plus noise ratio threshold for the user equipment.

8. The apparatus as claimed in claim 6,
wherein the duplexing mode to be used is based on a scheduled bandwidth and the full duplex self-interference cancellation reporting is triggered by an evaluation of uplink power against uplink power threshold, or
wherein the duplexing mode to be used is based on a scheduled bandwidth and an absolute uplink power obtained by periodic uplink power headroom reporting.

9. The apparatus as claimed in claim 3, wherein the metric conditions, comprise a bandwidth threshold,
wherein during the cell search or attachment period a frequency division self-interference calculation is disabled at the user equipment, and wherein based on at least one of a scheduled bandwidth being less than or equal to the bandwidth threshold or a transmitter power control of the user equipment being less than or equal to 0, the instructions comprise a trigger to enable the frequency division self-interference calculation at the user equipment.

10. The apparatus as claimed in claim 3, wherein the metric thresholds are fixed threshold values for at least one of all uplink or downlink configurations or obtained from a list of uplink or downlink configuration-specific values.

11. The apparatus as claimed in claim 3, wherein the at least one memory is storing instructions that when executed by the at least one processor, cause the apparatus to: report updated threshold values to the base station while in the radio resource control connected state.

12. An apparatus comprising:
at least one processor; and
at least one memory including computer program code, the at least one memory storing instructions, that when executed by the at least one processor, cause the apparatus to:
receive a full duplex capability based on metric thresholds from a user equipment, wherein the full duplex capability is based on evaluation of metrics of at least one of an uplink signal or downlink signal against the metric thresholds comprising a signal to interference plus noise ratio threshold for the user equipment,
wherein the metric thresholds are based on values associated with at least uplink power of the user equipment compared to an uplink power threshold, and values associated with at least one of an uplink signal or downlink signal of the user equipment compared to the signal to interference plus noise ratio threshold for the user equipment;
when in a radio resource control connected state, initially schedule the user equipment for communications in a time division duplex mode;
receive reports of metric conditions dynamically from the user equipment; and
send instructions, based on the reports of the metric conditions, to the user equipment to communicate in one of a full duplex mode and a time division duplex mode.

13. The apparatus as claimed in claim 12, wherein the full duplex capability is one of "capable" and "not capable" to communicate in full duplex mode.

14. The apparatus as claimed in claim 12, wherein the metric conditions include one of:
an uplink power threshold, said uplink power threshold being such that the user equipment supports full duplex operation only below the uplink power threshold;
a bandwidth threshold, said bandwidth threshold being such that the user equipment supports full duplex operation only below the bandwidth threshold; and
a duplexing mode switching time, said duplexing mode switching time being a guard time required by the user equipment for switching duplex mode between full duplex and time division duplex.

15. The apparatus as claimed in claim 12, wherein the base station configures the duplexing mode to be used by the user equipment based on a scheduled bandwidth and full duplex self-interference cancellation reporting triggered by an evaluation of uplink power against uplink power threshold and based on evaluation of the metrics of the at least one of an uplink signal or downlink signal against the metric thresholds comprising the signal to interference plus noise ratio threshold for the user equipment.

16. The apparatus as claimed in claim 12, wherein the base station configures the duplexing mode to be used by the user equipment based on a scheduled bandwidth and an estimation of uplink power and based on evaluation of the metrics of the at least one of an uplink signal or downlink signal against the metric thresholds comprising the signal to interference plus noise ratio threshold for the user equipment.

17. The apparatus as claimed in claim 12, wherein the base station configures the duplexing mode to be used by the user equipment based on a scheduled bandwidth and full duplex self-interference cancellation reporting triggered by an evaluation of uplink power against uplink power threshold.

18. The apparatus as claimed in claim 12, wherein the base station configures the duplexing mode to be used by the user equipment based on a scheduled bandwidth and an absolute uplink power of the user equipment obtained by periodic uplink power headroom reporting.

19. The apparatus as claimed in claim 12, wherein the metric thresholds are fixed threshold values for at least one of all uplink or downlink configurations or obtained from a list of uplink or downlink configuration-specific values.

20. The apparatus as claimed in claim 12, wherein the at least one memory is storing instructions that when executed by the at least one processor, cause the apparatus to:
receive reports of updated threshold values from the user equipment while in the radio resource control connected state.

* * * * *